United States Patent
Kubota et al.

(10) Patent No.: US 8,090,020 B2
(45) Date of Patent: Jan. 3, 2012

(54) MOVING PICTURE ENCODING DEVICE, FADE SCENE DETECTION DEVICE AND STORAGE MEDIUM

(75) Inventors: Tomonori Kubota, Kawasaki (JP);
Makiko Konoshima, Kawasaki (JP);
Yuichiro Teshigahara, Kawasaki (JP);
Hiroyuki Masatsugu, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1382 days.

(21) Appl. No.: 11/342,976

(22) Filed: Jan. 31, 2006

(65) Prior Publication Data

US 2007/0098074 A1    May 3, 2007

(30) Foreign Application Priority Data

Oct. 31, 2005   (JP) ................................ 2005-317662

(51) Int. Cl.
*H04N 7/12* (2006.01)
(52) U.S. Cl. ......... 375/240.16; 375/240.24; 375/240.12; 382/235; 382/236; 382/232; 382/238
(58) Field of Classification Search .................. 375/240, 375/240.16
See application file for complete search history.

(56) References Cited

U.S. PATENT DOCUMENTS

| | | | | |
|---|---|---|---|---|
| 6,040,865 A | * | 3/2000 | Kato et al. | 375/240.16 |
| 6,327,390 B1 | * | 12/2001 | Sun et al. | 382/235 |
| 6,459,733 B1 | | 10/2002 | Yokoyama et al. | |
| 6,625,214 B1 | * | 9/2003 | Umehara et al. | 375/240.12 |
| 2006/0285586 A1 | * | 12/2006 | Westerman | 375/240 |

FOREIGN PATENT DOCUMENTS

| | | |
|---|---|---|
| JP | 08-317387 A | 11/1996 |
| JP | 11-008854 A | 1/1999 |
| JP | 2000-59775 | 2/2000 |
| JP | 2000-261810 A | 9/2000 |
| JP | 2002-51341 | 2/2002 |

OTHER PUBLICATIONS

"Japanese Office Action", mailed by JPO and corresponding to Japanese application No. 2005-317662 on Jul. 6, 2010, with partial English translation.

* cited by examiner

*Primary Examiner* — Shuwang Liu
*Assistant Examiner* — Lihong Yu
(74) *Attorney, Agent, or Firm* — Fujitsu Patent Center (57) ABSTRACT

An original picture inserted for each frame is divided into motion compensation blocks and each of the motion compensation blocks is encoded using motion compensation inter-frame prediction. A fade scene is detected using at least one of a sum of differential absolute values calculated when detecting a motion vector, a total number of motion compensation blocks and a total number of intra-motion compensation blocks being motion compensation blocks encoded as still pictures in addition to a motion vector detected from each of the motion compensation blocks. The encoding of the original picture is controlled, according to the detection result.

12 Claims, 13 Drawing Sheets

MOVING PICTURE ENCODING DEVICE, FADE SCENE DETECTION DEVICE AND STORAGE MEDIUM

CROSS-REFERENCE TO RELATED APPLICATIONS

This application is based upon and claims the benefit of priority from the prior Japanese Patent Application No. 2005-317662 filed on Oct. 31, 2005, the entire contents of which are incorporated herein by reference.

BACKGROUND OF THE INVITATION

1. Field of the Invention

The present invention relates to a technology for dividing an original picture inputted for each frame into motion compensation blocks and encoding each motion compensation block using motion compensation inter-frame prediction.

2. Description of the Related Art

Currently, a variety of methods are developed for the encoding of a moving picture. Such an encoding method includes one method for dividing an original picture to be encoded into motion compensation blocks and encoding each of the motion compensation blocks using motion compensation inter-frame prediction. The motion compensation inter-frame prediction is conducted by detecting the motion vector of a motion compensation block between consecutive frames.

In a moving picture (video), a variety of special-effect scenes are used as requested. In that case, fade scenes, such as fade-in or fade-out, are sometimes inserted as such an effect scene. In the encoding method using the motion compensation inter-frame prediction, it is known that a prediction error between frame increases in such a fade scene. In the assumption to maintain the same picture quality, the amount of data (information) of encoded data (amount of codes) obtained by encoding an original picture increases as a prediction error increases. Therefore, the conventional moving picture encoding device includes one which suppresses the degradation of picture quality by detecting a fade scene and adjusting the amount of data assigned to data to be encoded (Japanese Patent Application Publication No. 2000-59775).

In the fade scene, the entire brightness of an original picture sequentially changes. In the conventional moving picture encoding device set forth in Japanese Patent Application Publication No. 2000-59775, such a characteristic is focused and a fade scene is detected. The conventional moving picture encoding device set forth in Japanese Patent Application Publication No. 2002-51341, furthermore a motion vector is focused and a fade scene is detected. When a fade scene is detected, a motion vector is avoided from being encoded by compulsorily setting it to a zero level (corresponding to assigning a 0 point being the original position) and the amount of data to be encoded (amount of codes) is suppressed.

The conventional moving picture encoding device set forth in Japanese Patent Application Publication No. 2002-51341 can detect a fade scene with higher accuracy than the conventional moving picture encoding device set forth in Japanese Patent Application Publication No. 2000-59775, furthermore by focusing on a motion vector. However, actually sufficient accuracy cannot be obtained yet. Therefore, it is desired to a fade scene with higher accuracy.

In the encoding method using motion compensation inter-frame prediction, a difference (error) between an original picture and a predicted picture is encoded. In Japanese Patent Application Publication No. 2002-51341, in order to avoid the selection of an unnecessary motion vector, the motion vector is compulsorily made a zero vector. However, when the motion vector is made a zero vector, there is a possibility that the error increases. When the error increases, the amount of data (information) which is assigned to the amount of codes in order to suppress the degradation of picture quality increases. Thus, in order to more appropriately encode data when detecting a fade scene, the selection of an unnecessary motion vector must be avoided and also the degradation of image quality must be more avoided.

SUMMARY ON THE INVENTION

It is the first object of the present invention to provide a technology for more accurately detecting a fade scene. It is the second object of the present invention to provide a technology for more appropriately encoding data when detecting a fade scene.

The moving picture encoding device of the present invention presumes dividing an original picture inputted for each frame into motion compensation blocks and encoding each of the motion compensation blocks using motion compensation inter-frame prediction. The device comprises a moving picture encoding unit for dividing an original picture into motion compensation blocks and encoding each motion compensation block, a fade scene detection unit for detecting a fade scene using plural data provided by the moving picture encoding unit and an encoding control unit for controlling the encoding by the moving picture encoding unit of the original picture according to the detection result of the fade scene detection unit.

DESCRIPTION OF THE PREFERRED EMBODIMENTS

Firstly, the outline of the present inventions are described.

The moving picture encoding device of the present invention presumes dividing an original picture inputted for each frame into motion compensation blocks and encoding each of the motion compensation blocks using motion compensation inter-frame prediction. The moving picture encoding device comprises a moving picture encoding unit for dividing an original picture into motion compensation blocks and encoding each motion compensation block using motion compensation inter-frame prediction, a fade scene detection unit for detecting a fade scene using at least one of the sum of absolute differential values calculated when detecting a motion vector, the total number of motion compensation blocks and the total number of intra-motion compensation blocks being motion compensation blocks encoded as still pictures in addition to the motion vector detected in each motion compensation block by the moving picture encoding unit and an encoding control unit for controlling the encoding by the moving picture encoding unit of the original picture constituting the fade scene according to the detection result of the fade scene detection unit.

The fade scene detection device of the present invention presumes detecting a fade scene inserted in a moving picture. The detection device comprises an acquisition unit for obtaining at least one of the sum of absolute differential values calculated when detecting a motion vector, the total number of motion compensation blocks and the total number of intra-motion compensation blocks being motion compensation blocks encoded as still pictures in addition to the motion vector detected in each motion compensation block by the moving picture encoding unit which are obtained when dividing an original picture inputted for each frame as a moving picture into motion compensation blocks and encoding each of the motion compensation blocks using motion compensation inter-frame prediction, as information for the fade scene detection and a fade scene detection unit for detecting the fade scene using a plurality of pieces of information obtained by the acquisition unit.

The present invention obtains at least one of the sum of absolute differential values (SAD) calculated when detecting a motion vector, the total number of motion compensation blocks and the total number of intra-motion compensation blocks being motion compensation blocks encoded as still pictures in addition to the motion vector detected in each motion compensation block as information for fade scene detection and detects a fade scene using a plurality of pieces of obtained information. Since a plurality of pieces of information is used, a fade scene can be detected more-sidedly. As a result, high detection accuracy can be realized.

The present invention controls the encoding of an original picture constituting a fade scene according to the detection result of a fade scene. Thus, in the encoding of an original picture constituting a fade scene, for example, at least one of further narrowing a range for searching for a motion vector, further facilitating the selection of bi-directional prediction, further facilitating the selection of a zero point by a motion vector and increasing the amount of data assigned to encoded data is conducted. By such control, the degradation of picture quality can be further suppressed, the detection of a motion vector can be managed more systematically and the amount of operation can be further suppressed. As a result, encoding at the time of fade scene detection can be conducted more appropriately.

The preferred embodiments of the present invention are described below with reference to the drawings.

The First Preferred Embodiment

Figure 1:
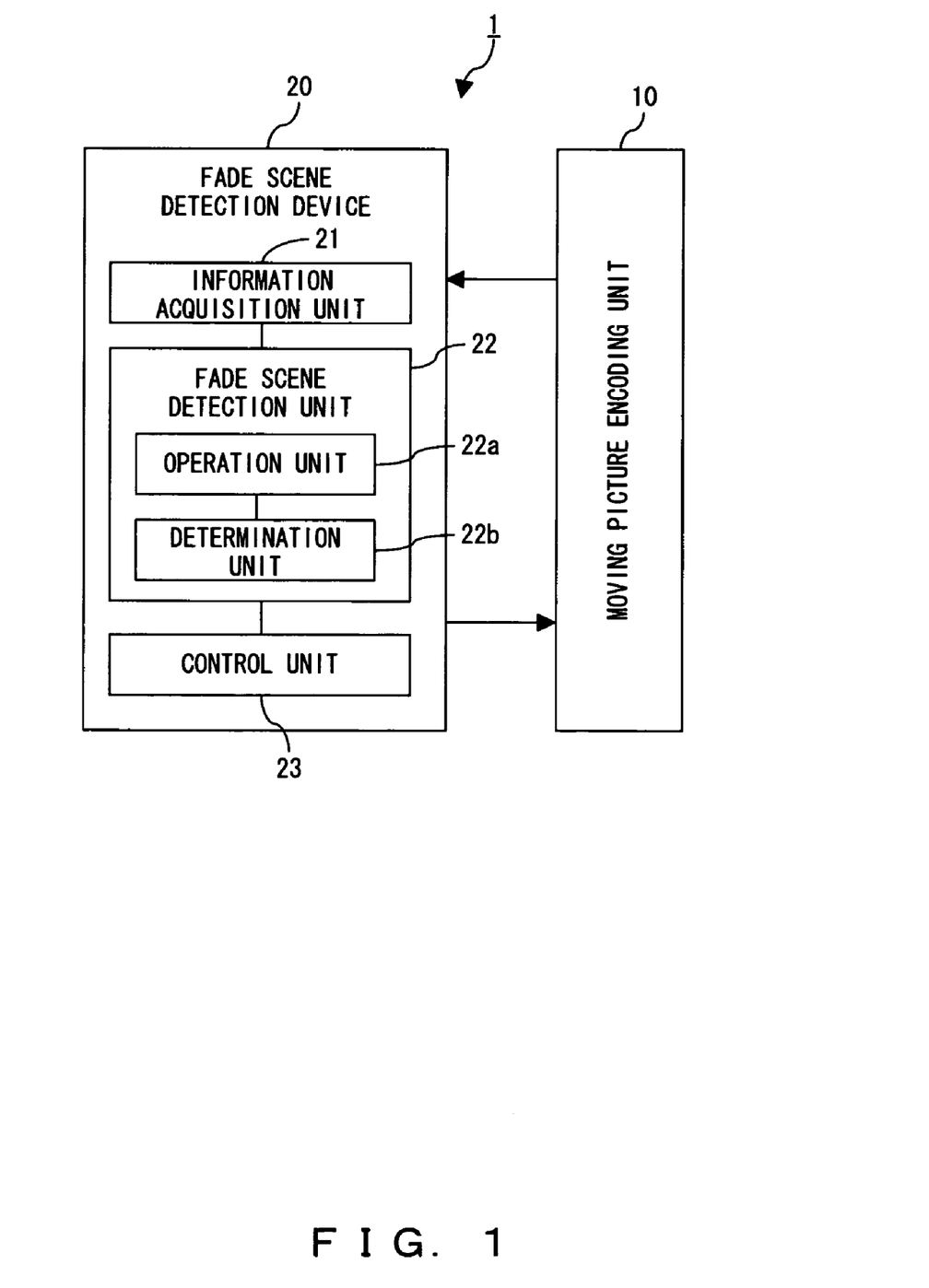
FIG. 1 shows the configuration of the moving picture encoding device of the first preferred embodiment.

FIG. 1 shows the configuration of the moving picture encoding device of the first preferred embodiment. The basic configuration of the moving picture encoding device adopting the present invention is described in detail with reference to FIG. 1.

The moving picture encoding device 1 divides an original picture inputted for each frame into motion compensation blocks and encodes each of the motion compensation blocks using motion compensation inter-frame prediction. The moving picture encoding device 1 comprises a moving picture encoding unit 10 for encoding the blocks and a fade scene detection device 20 for detecting a fade scene.

The fade scene detection device 20 comprises an information acquisition unit 21 for obtaining information for fade scene detection from the moving picture encoding unit 20, a fade scene detection unit 22 for detecting a fade scene using the information and a control unit 23 for controlling the encoding of the moving picture encoding unit 10 using the detection result.

The information acquisition unit 21 obtains at least one of the sum of absolute differential values (SAD) calculated when detecting a motion vector, the total number of motion compensation blocks and the total number of intra-motion compensation blocks being motion compensation blocks encoded as still pictures in addition to the motion vector detected in each motion compensation block as the information. The operation unit 22a of the fade scene detection unit 22 performs operation using the information obtained by the information acquisition unit 21 and outputs the operation result to a determination unit 2b. The determination unit 22b determines whether it is a fade scene, based on the operation result. Thus, if, for example, the horizontal and vertical factors of a motion vector are Vx and Vy, respectively, the determination is made based on whether the each of all the following expressions is held.

$$\Sigma |Vx| > \text{first threshold}, \Sigma |Vy| > \text{second threshold} \quad (1)$$

$$|\Sigma Vx/\Sigma |Vx|| < \text{third threshold}, |\Sigma Vy/\Sigma |Vy|| < \text{fourth threshold} \quad (2)$$

$$\text{Total number of intra-motion compensation blocks/} \\ \text{total number of motion compensation} \\ \text{blocks} > \text{fifth threshold} \quad (3)$$

$$\text{Sixth threshold} < \Sigma \text{sum of absolute differential values} \\ \text{of motion compensation blocks} < \text{seventh threshold} \quad (4)$$

By many-sidedly detecting a fade scene using such determination, high detection accuracy can be realized.

The control unit 23 controls the encoding of the moving picture encoding unit 10 by conducting at least one of further narrowing a range for searching for a motion vector, further facilitating the selection of bi-directional prediction, further facilitating the selection of a zero point by a motion vector and increasing the amount of data assigned to encoded data when a fade scene is detected. By such control, the degradation of picture quality can be further suppressed, the detection of a motion vector can be managed more systematically and the amount of operation can be further suppressed. As a result, encoding at the time of fade scene detection can be conducted more appropriately.

The Second Preferred Embodiment

Figure 2:
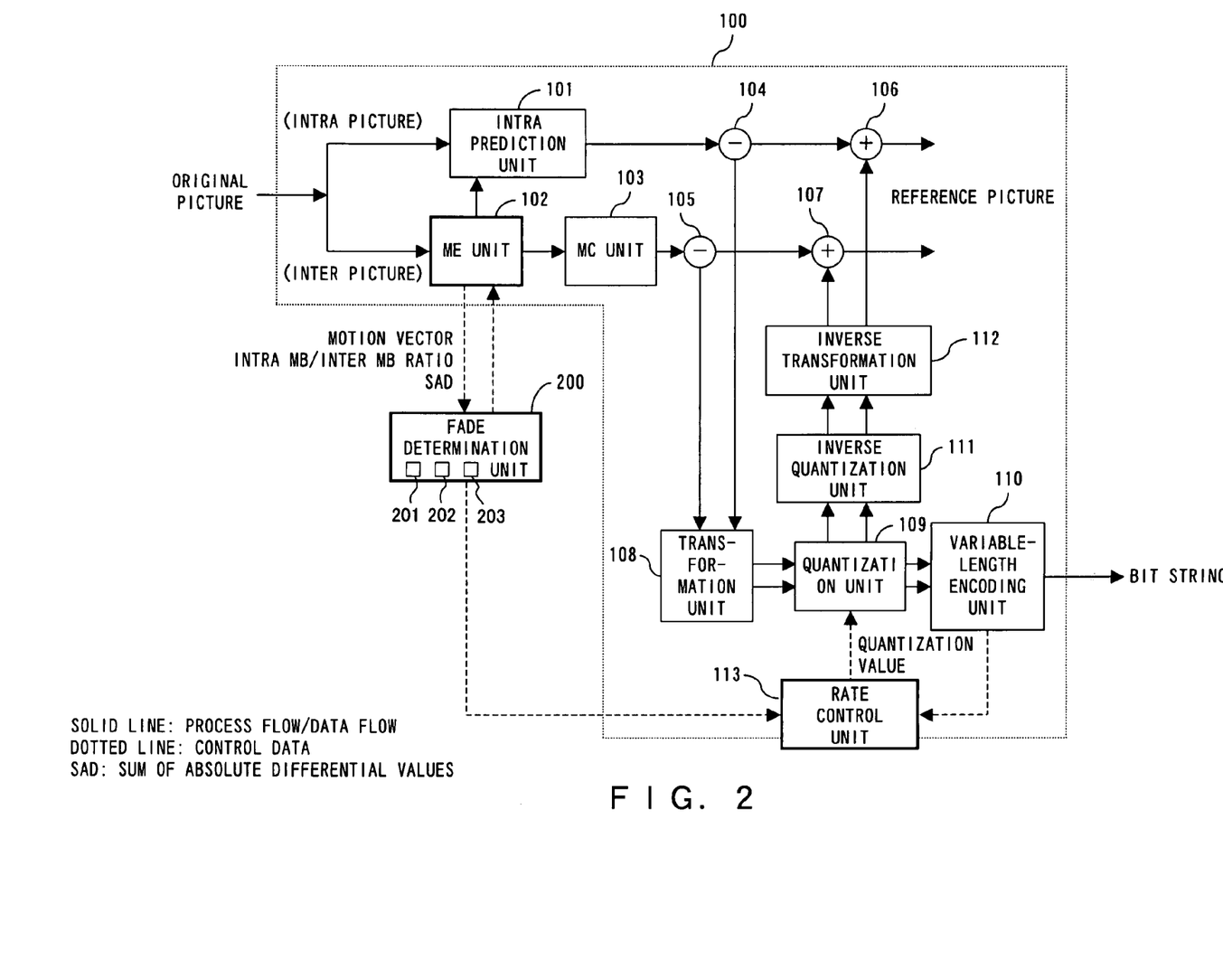
FIG. 2 shows the configuration of the moving picture encoding device of the second preferred embodiment.

FIG. 2 shows the configuration of the moving picture encoding device of the second preferred embodiment.

As shown in FIG. 2, the moving picture encoding device comprises an encoding unit 100 for encoding an original picture constituting a moving picture and a fade determination unit 200 for detecting a fade scene.

The encoding unit 100 divides an original picture to be encoded into pixel blocks and encodes each of the motion compensation blocks, composed of one or more pixel blocks, using motion compensation inter-frame prediction.

The original picture constituting a moving picture is inputted for each frame or field. The frame/field is classified into a predicted (P) frame/field in which encoding is performed using only forward prediction, a bi-direction (B) predicted frame/field in which encoding is performed selecting and using one of forward prediction, backward prediction and bi-directional prediction and an intra-coded (I) frame/field in which encoding is performed without using intra-frame prediction. Here, the pictures of P, B and I frame/fields are called a P picture, a B picture and an I picture (intra-picture), respectively. P and B pictures are called together inter-pictures.

An original picture is inputted to each of an intra-prediction unit 101 and a motion estimation (ME) unit 102 regardless of its type. The intra-prediction unit is used for the encoding of intra-pictures, and the ME unit is used for the encoding of inter-pictures.

The intra-prediction unit 101 predicts a pixel value (sample value) in another position of the same original picture and generates a predicted picture. The prediction is performed to each motion compensation block. The predicted picture is outputted to a subtracter 104 together with the original picture. The subtracter 104 calculates a difference between the pictures (differential picture) and outputs the differential picture and the predicted picture to a transformation unit 108 and an adder 106, respectively.

Recently, the use of only one type of size-fixed motion compensation blocks (macro-blocks) is not sufficient. A plurality of motion compensation blocks with different block sizes or partitions (sub-block size or its combination) are prepared and appropriate one is selected from them. However, here it is assumed for convenience' sake that only one type of motion compensation blocks is used.

The transformation unit 108 divides the differential picture into prescribed pixel blocks and applies orthogonal transformation, such as discrete cosine transform (DCT), integer transform or the like, to each pixel block and transforms the pixel block into a frequency component value. Here it is assumed for convenience' sake that DCT is used for the orthogonal transformation. By performing the DCT, a DCT co-efficient is calculated and is outputted to a quantization unit 109. The quantization unit 109 quantizes the coefficient according to a quantization value (quantization step) specified by a rate control unit 113 for controlling the amount of codes generated by encoding. A variable-length encoding unit 110 receives a coefficient after inverse quantization from the quantization unit 109, applies variable-length encoding (entropy encoding) and generates encoded data. Various types of parameters needed for decoding are attached to the encoded data. They are outputted as encoded bit string.

The rate control unit 113 controls so that the amount of data of the encoded bit string generated by the variable-length encoding unit 110 will be appropriate. The rate control unit 113 determines the quantization step so that the amount of data coincides with the assigned amount of data (assigned amount of information) and instructs the quantization unit 109 so.

An inverse-quantization unit 111 receives a quantization value and a DCT coefficient from the quantization unit 109 and applies inverse-quantization to the coefficient. An inverse-transformation unit 112 receives the inversely quantized coefficient from the inverse quantization unit 111, applies inverse-transform (inverse-DCT here according to the above assumption) and the differential picture is decoded. The decoded differential picture is outputted to the adder 106. The adder 106 adds the differential picture to the predicted picture to decode the original picture. The "reference picture" shown in FIG. 2 is the decoded original picture.

The original picture other than the intra-picture is inputted to the ME unit 102 as an inter-picture. The ME unit 102 selects a target inter-frame prediction method according to the type of an inter-picture and detects a motion vector for each motion compensation block. A motion compensation (MC) unit 103 outputs a picture determined by a motion vector detected for each motion compensation block and a selected inter-frame prediction method (reference picture). A subtracter 105 calculates a difference between pictures (differential picture) and outputs a differential picture and a predicted picture to the transformation unit 108 and an adder 107, respectively, like the subtracter 104.

Figure 3:
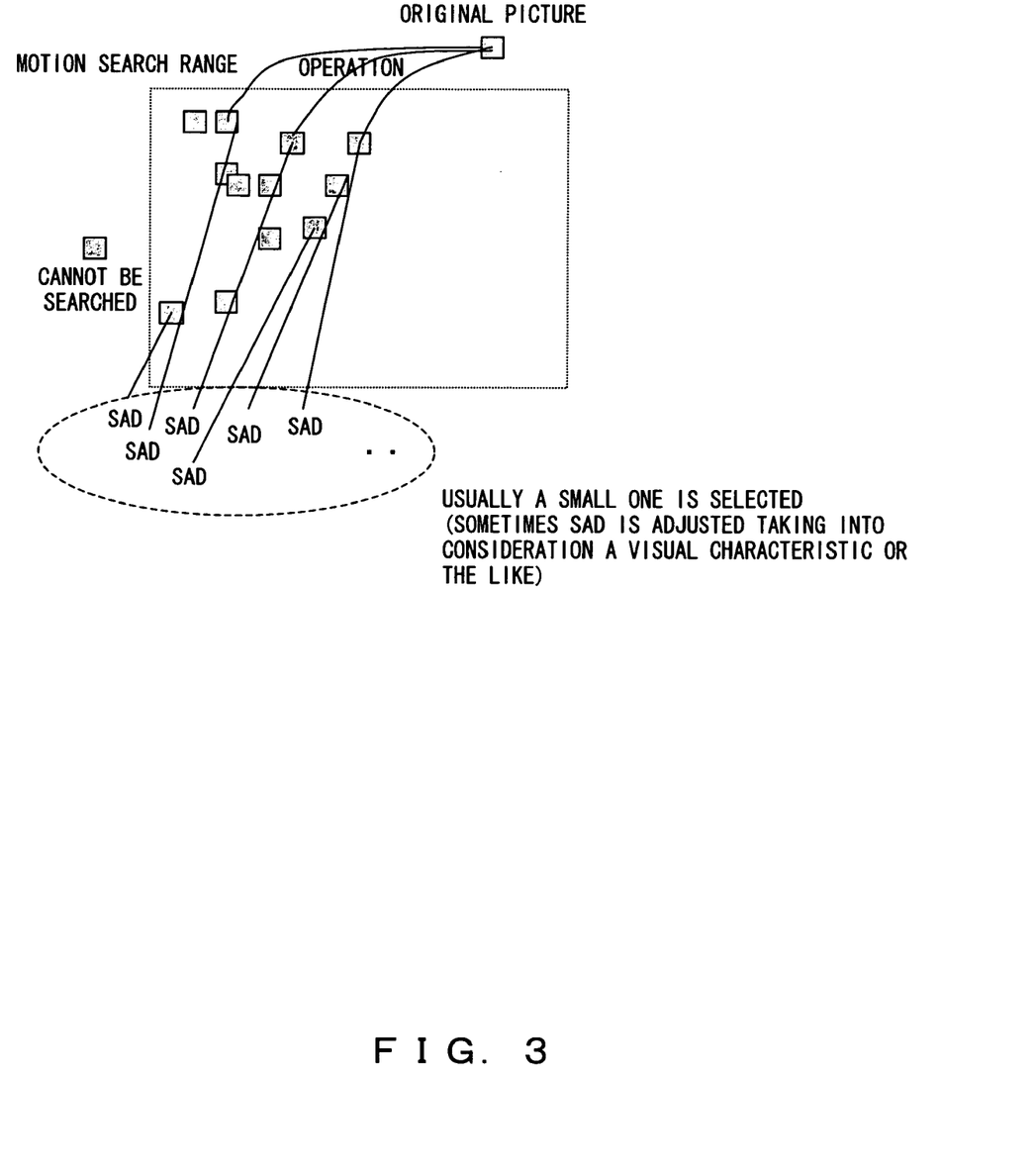
FIG. 3 shows how to detect a motion vector.

FIG. 3 shows how to detect a motion vector. The motion vector indicates a difference between the position of a target motion compensation block in an original picture and the position in the reference picture of its optimal part. It is preferable to search for the optimal part in the entire reference picture. However, the amount of operation needed for it becomes enormous. Therefore, as shown in FIG. 3, it is common to determine a motion search range and to detect an optimal part, that is, a motion vector. As to the optimal part it is popular to calculate the differential value between a motion compensation block and its corresponding reference picture (predicted picture) part and to adopt a part with the lowest cost, using its size as cost. The Sum of absolute differential values (SAD) is obtained by accumulating the absolute values of differential values obtained for each pixel. If the SAD is adopted, a motion vector can be detected by searching for a part in which the value is minimized in the reference picture. The reference picture is selected according to the type of inter-frame prediction.

Each of the units 108-112 operates in the same way as in the case of an intra-picture. As a result, the inverse transformation unit 112 receives a DC component and an AC component after inverse quantization from the inverse quantization unit 111, applies inverse DCT to them and decodes the differential picture in an inter-picture. The decoded differential picture is outputted to the adder 107. Then, the adder 107 adds the differential picture to the predicted picture to decode the original picture.

The fade determination unit 200 detects a fade scene inserted in a moving picture. The fade determination unit 200 receives a motion vector for each motion compensation block, SAD, the total number of motion compensation blocks (inter-motion compensation blocks) and the total number of intra-motion compensation blocks being motion compensation blocks encoded as a still picture from the ME unit 102 as information for the detection. Thus, as in the first preferred embodiment, when all the above-described conditional expressions (1)-(4) are held, it is determined to be a fade scene. By using information obtainable from the ME unit 102 for detection, the amount of operation needed to detect it can be suppressed while realizing high detection accuracy.

The above-described conditional expressions (1)-(4) are used for the following reasons.

Figure 4A:
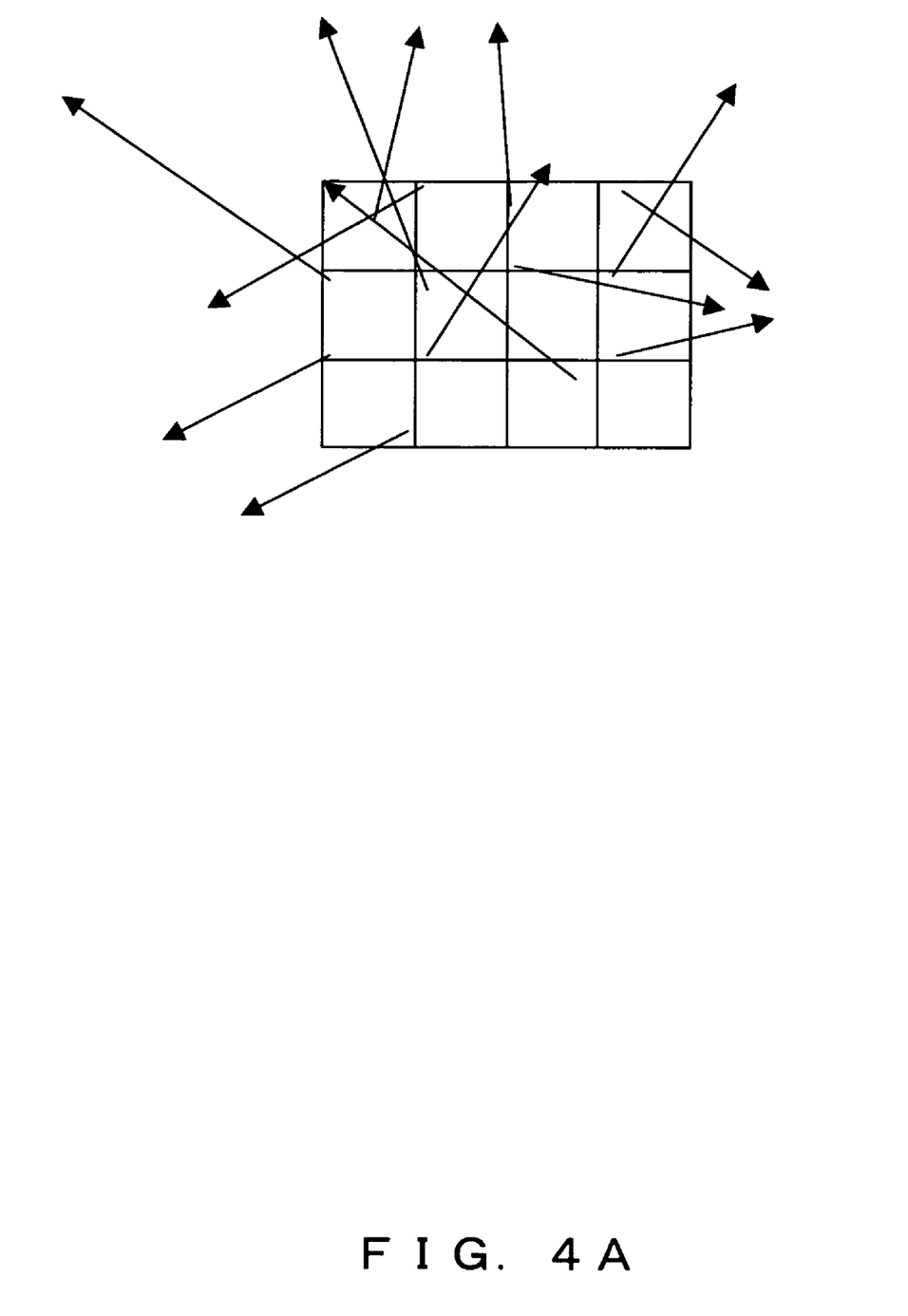
FIG. 4A shows motion vectors detected at the time of a fade scene.

FIG. 4A shows motion vectors detected at the time of a fade scene. Each frame shown in FIG. 4A indicates a motion compensation block and an arrow indicates the direction and size of a motion vector. This also applies to FIG. 4B.

As shown in FIG. 4A, in a fade scene, a fairly large motion vector is detected. Although its direction is not perfectly at random, it is also not much fixed. Conditional expressions (1) and (2) are used to detect such a motion vector.

In a fade scene, the level of a brightness signal varies for each frame. Therefore, even if a weight coefficient is applied to the brightness signal adaptively to the reference picture, many motion compensation blocks with a large prediction error (SAD) are generated. In a P picture, such a motion compensation block becomes an intra-motion compensation block to be encoded in a still picture mode and its rate to all the motion compensation blocks increases. As a whole, SAD becomes fairly large. The above-describe conditional expressions (3) and (4) are used to detect such a feature.

In an original picture that satisfies all the above-described conditional expressions, a fairly large motion vector is detected at fairly random, fairly many intra-motion compensation blocks are generated, pixel values are not the same as a whole and prediction does not go wide too much.

By using conditional expression (2) in addition to conditional expression (1), a direction peculiar to a motion vector detected in a fade scene can be taken into consideration. By using conditional expressions (3) and (4), a unique prediction error generated in a fade scene can also be taken into consideration. As a result, a fade scene can be detected more surely.

All conditional expressions (2)-(4) are not always used together with conditional expression (1). At least one of conditional expressions (2)-(4) can also be used together with another conditional expression. Such a variety of variations can be possible.

Figure 6:
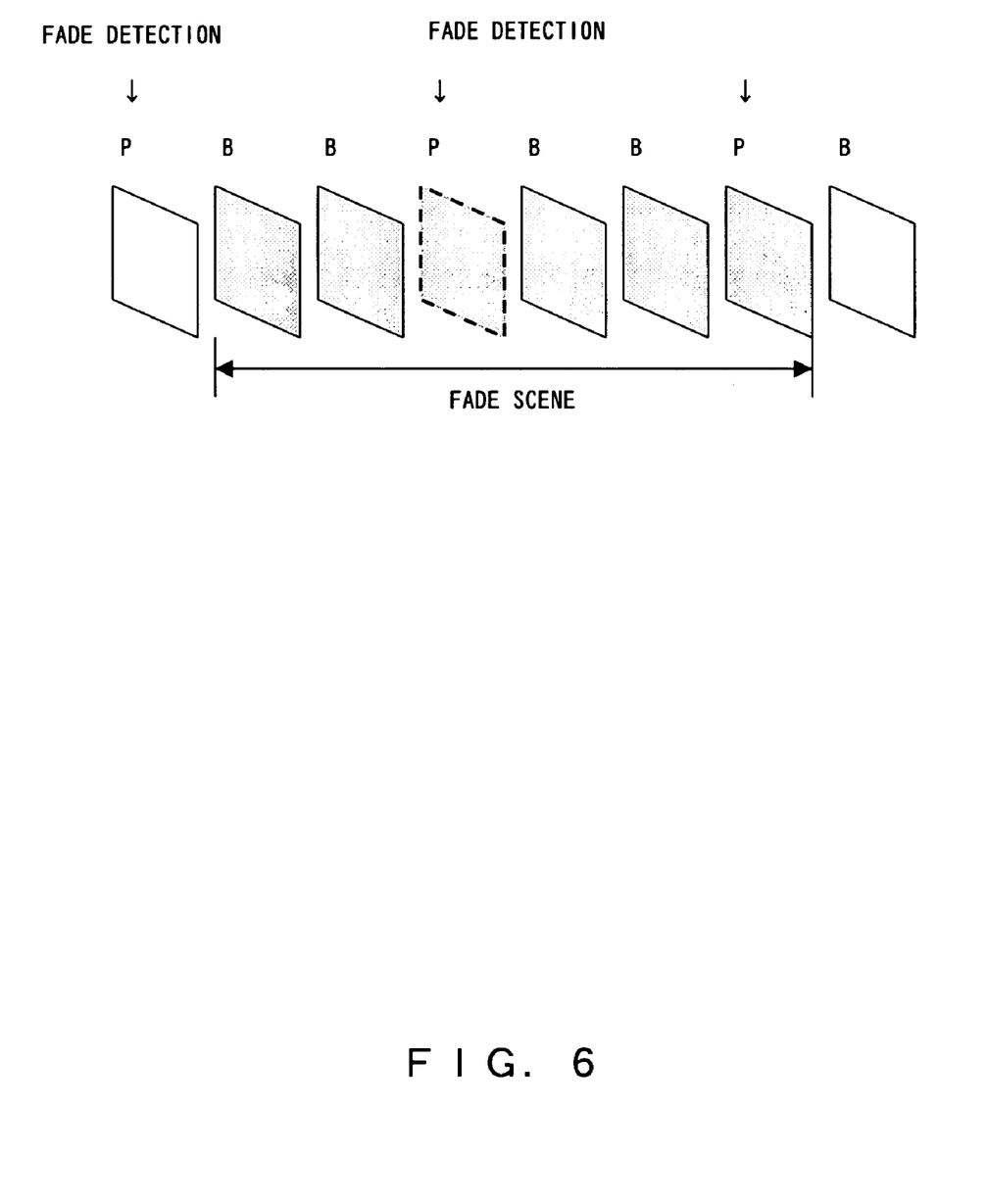
FIG. 6 explains a fade scene range.

FIG. 6 explains a fade scene range. "P" and "B" which are shown in FIG. 6, indicate p and B pictures, respectively.

The detection (determination) of a fade scene by the above-described conditional expressions (1)-(4) are performed only in the case of the encoding of a P picture. When a fade scene is detected thus, space between P or I pictures located immediately before and after the fade scene are determined as a fade scene range. The P or I located immediately before the fade scene is not included in the range. If a fade scene is detected again in a P picture adjacently located, space between the P picture and a P or I picture located immediately after it is determined as its range. In this way, a range is set using a P or I picture as an end.

When detecting a fade scene, the fade determination unit 200 exercises the following control in the fade scene range.

Figure 4B:
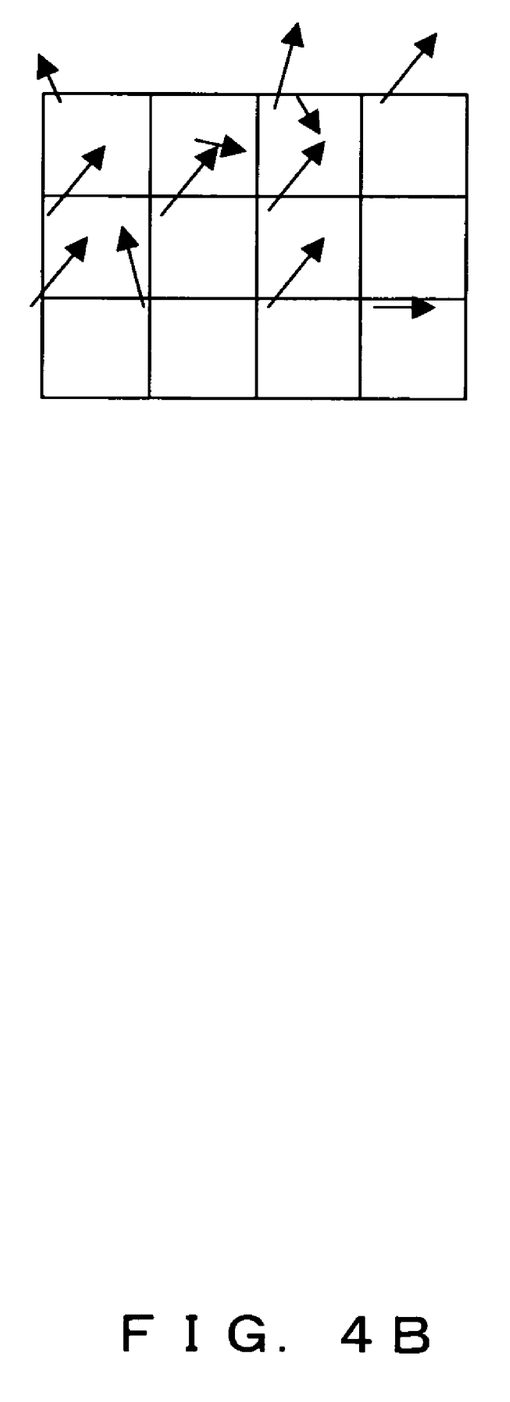
FIG. 4B shows motion vectors detected by restricting a motion search range at the time of a fade scene.
Figure 5:
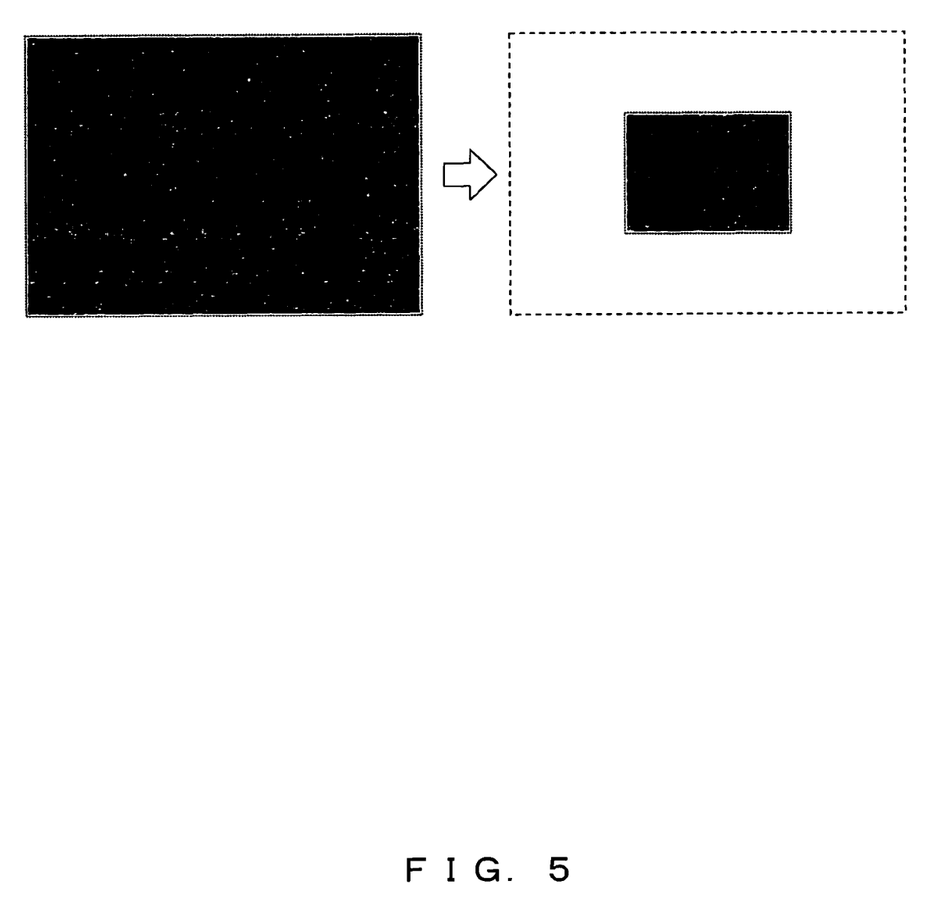
FIG. 5 explains the restriction of a motion search range at the time of fade scene detection.

As shown in FIG. 5, the fade determination unit 200 sets the B picture motion search range of the ME unit 102. The setting is made by specifying a range for each pixel in each of the x and y directions, on the basis of the original position of a motion compensation block. By such setting, the amount of operation can be suppressed. Furthermore, as shown in FIG. 4B, the order of motion vectors is improved and the dynamic change of the reference position can be further suppressed. As a result, the uneven feeling of image quality between pictures can be further suppressed. Compared with the case where a motion vector is forced to be at a zero level, a prediction error can be further suppressed.

Figure 7:
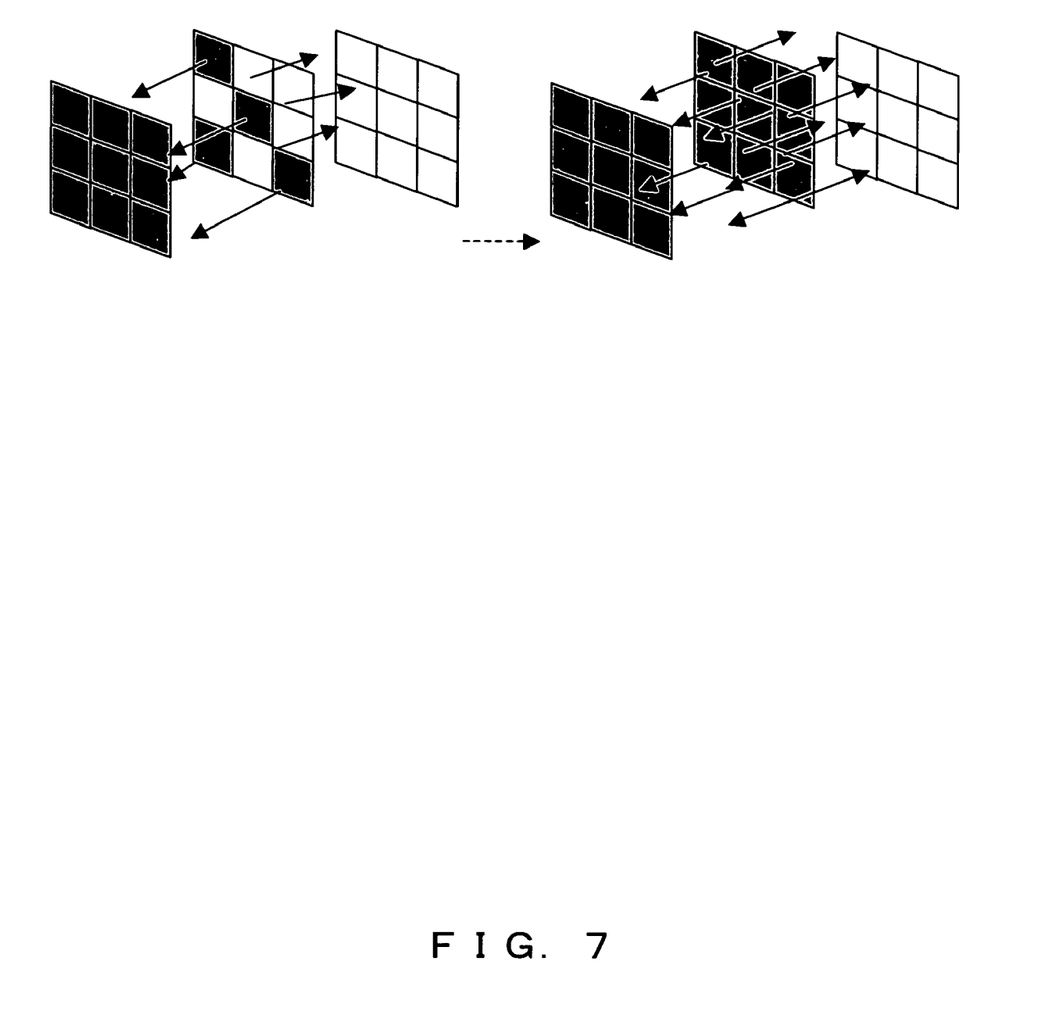
FIG. 7 explains an inter-frame prediction method implemented with priority at the time of a fade scene.

As shown in FIG. 7, in a B picture, bi-directional prediction is made to more easily select, and in bi-directional prediction, direct prediction is made to more easily select. In a motion vector, a zero vector (zero point) is made to more easily select. Those can be realized, for example, by modifying weight.

By making a zero vector to be more easily selected, the order of motion vectors can be further improved. If bi-direction prediction is made to more easily select, a picture is referenced (smoothed) in both time directions and the mixture in a target of difference between a picture in the forward direction and one in the backward direction can be further suppressed. In direct prediction, since a small number of bits are needed to encode motion information, a higher compression rate can be realized.

Figure 8:
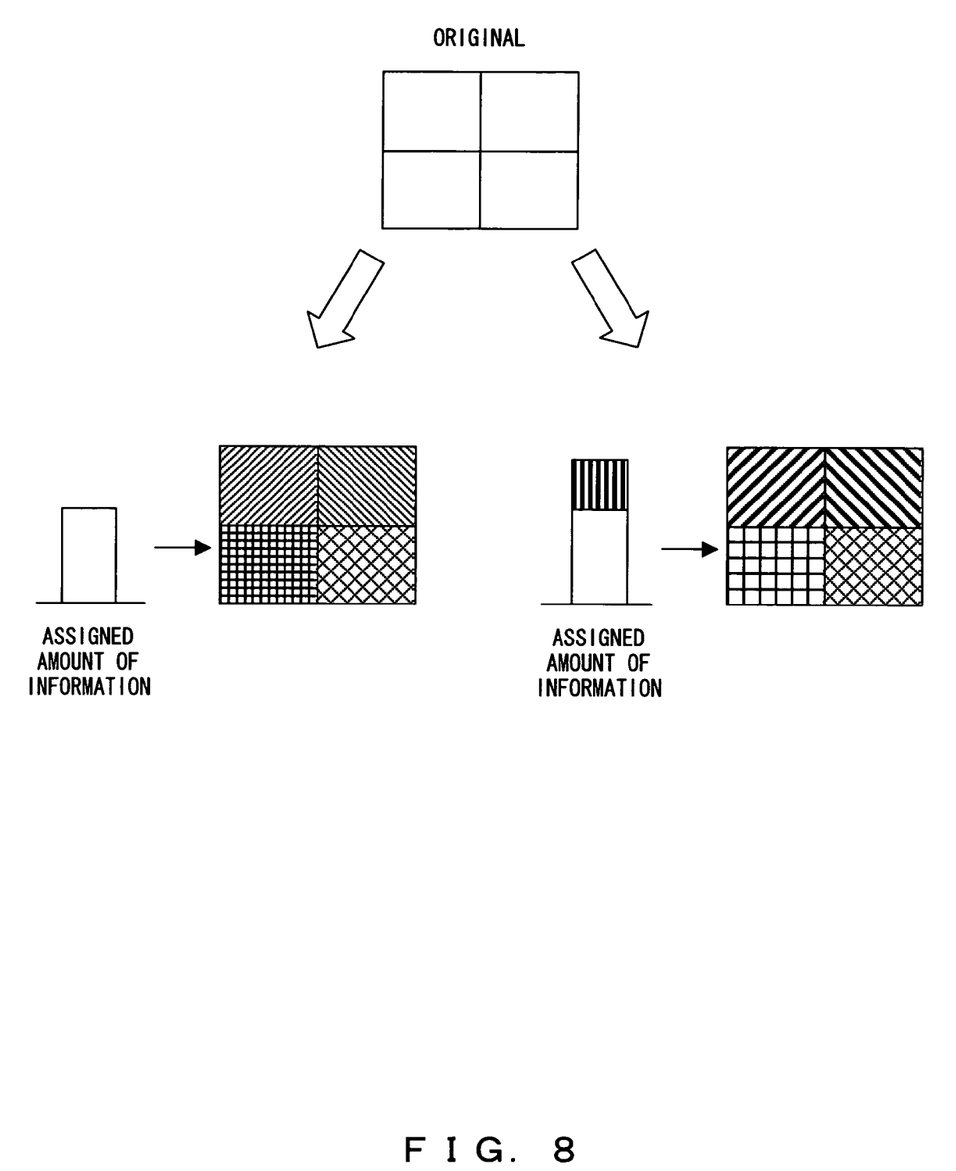
FIG. 8 shows the change of picture quality due to the assigned amount of information.

A large amount of information is assigned to the rate control unit 113. By assigning a large amount of information to the rate control unit 113, as shown in FIG. 8, reproducibility can be improved. In FIG. 8, the difference of picture quality is expressed by the number of lines. The larger the number of lines is, the more greatly picture quality degrades.

The rate control unit 113 controls a rate as follows, according to the instruction of the fade determination unit 200. The control is concretely explained with reference to the FIGS. 9A-9C.

Figure 9A:
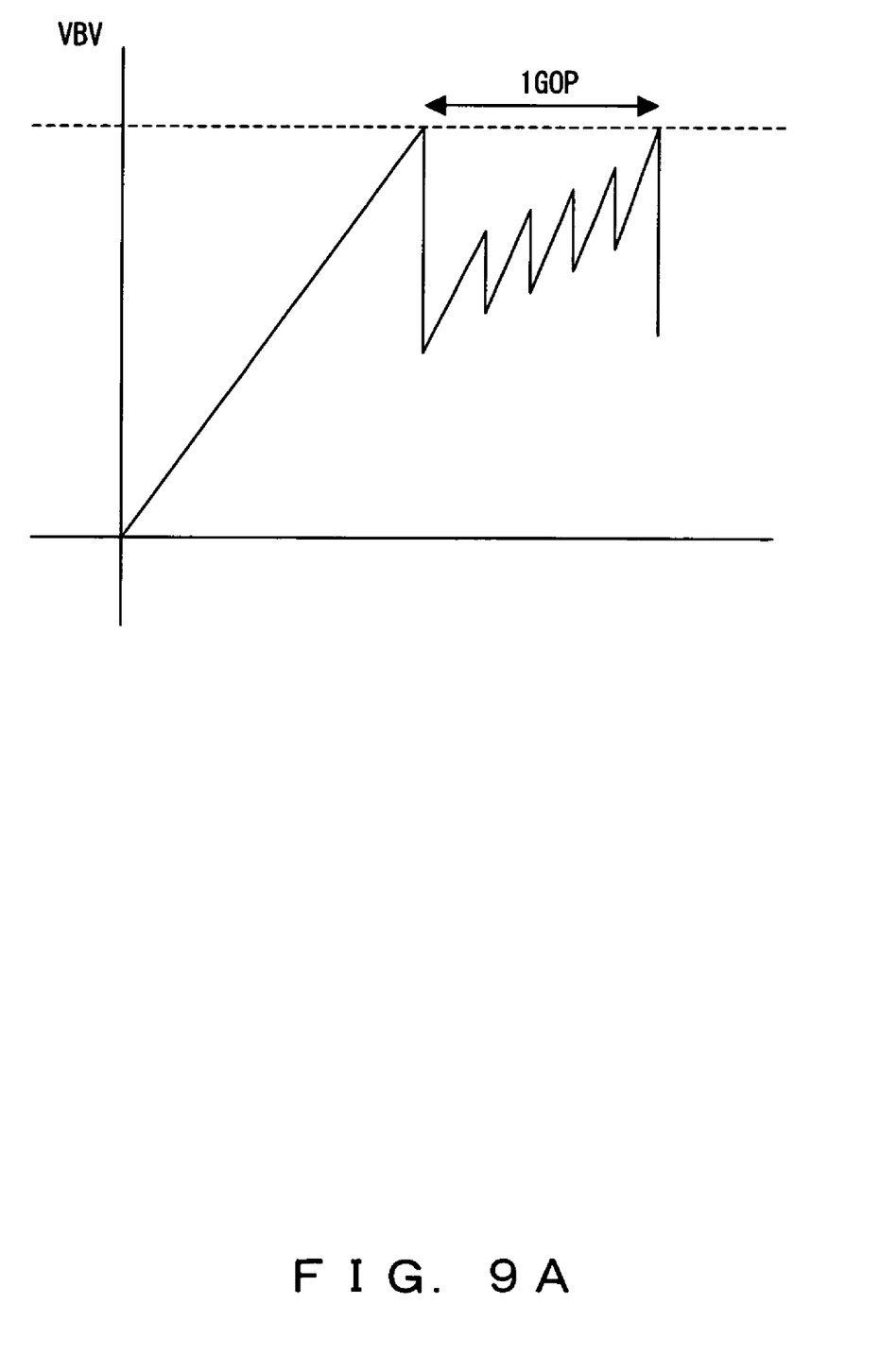
FIG. 9A explains the rate control at the time of a fade scene (No. 1).
Figure 9B:
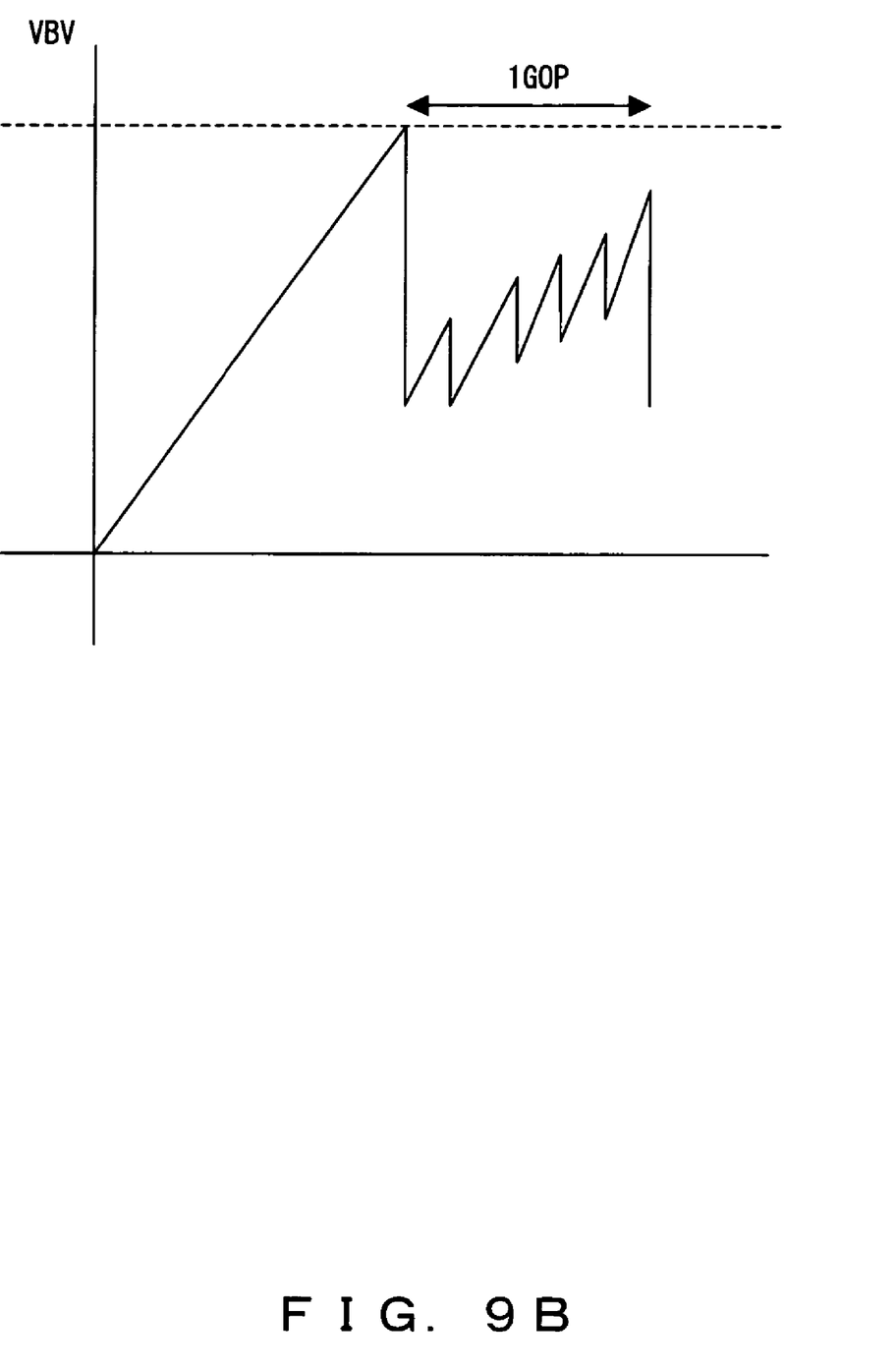
FIG. 9B explains the rate control at the time of a fade scene (No. 2).
Figure 9C:
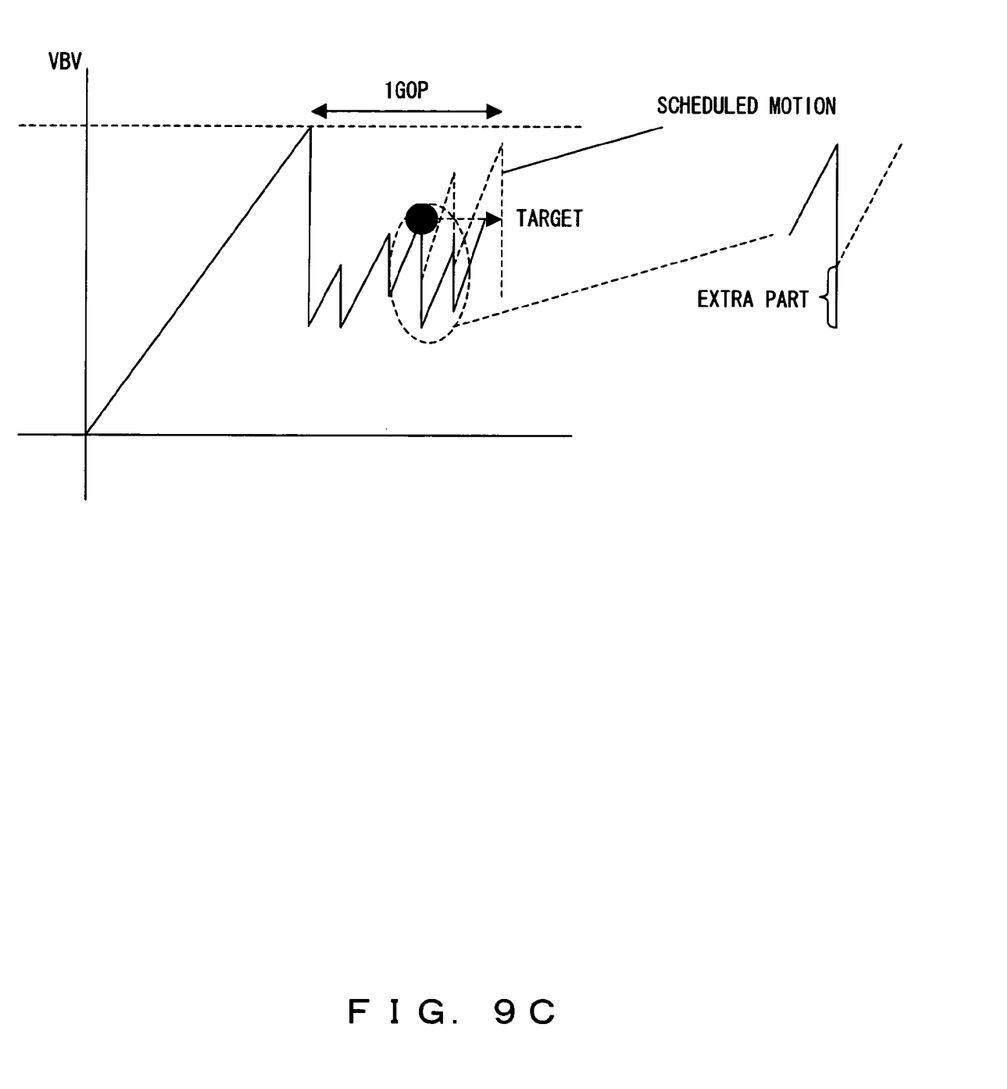
FIG. 9C explains the rate control at the time of a fade scene (No. 3).

The variable-length encoding unit 110 outputs a bit string, for example, according to the restriction of a video buffer verifier (VBV) buffer specified in MPEG-2 or the like. The rate control unit 113 receives an occupied amount of encoded data from the encoding unit 110 and controls a rate. In FIGS. 9A-9C, the vertical and horizontal axes indicate the amount of occupancy of a VBV buffer and time, respectively. A broken line in parallel to the horizontal axis indicates the maximum amount of occupancy of a VBV buffer. Thus, FIGS. 9A-9C show the time change of the actual amount of occupancy of a VBV buffer.

The ideal control of a VBV buffer neglecting picture quality in a constant bit rate (CBR) is to realize a status where a usable amount can be entirely used by one group of pictures (GOP). When such a status can be realized, as shown in FIG. 9A, the maximum amount of occupancy of a VBV buffer is shown at the end of one GOP. However, when a fairly large amount of information is assigned, as shown in FIG. 9B, the actual amount of occupancy decreases. When the line indicating the change of the amount of occupancy is located below the horizontal axis, the buffer fails. For that reason, in this preferred embodiment, since it is sufficient if the same level as the buffer status at the time of fade detection is recovered at the top of subsequent GOP, a fairly large amount of information is assigned to a GOP in which a fade is detected.

Thus, the calculation/prediction of a target recovery position and the distribution to each picture of extra amount of information over the initial amount leads to add the amount of recovery of the amount of occupancy of a buffer per one picture time. The rate control unit 113 calculates the amount of recovery and treats the increment of the assigned amount of information of each picture (vertically striped parting FIG. 8). By adding the increment, the amount of occupancy of a VBV buffer varies as shown in FIG. 9C. In FIG. 9C, a dotted line and a solid line indicate the predicted change of the amount of occupancy and its actual change.

Figure 10:
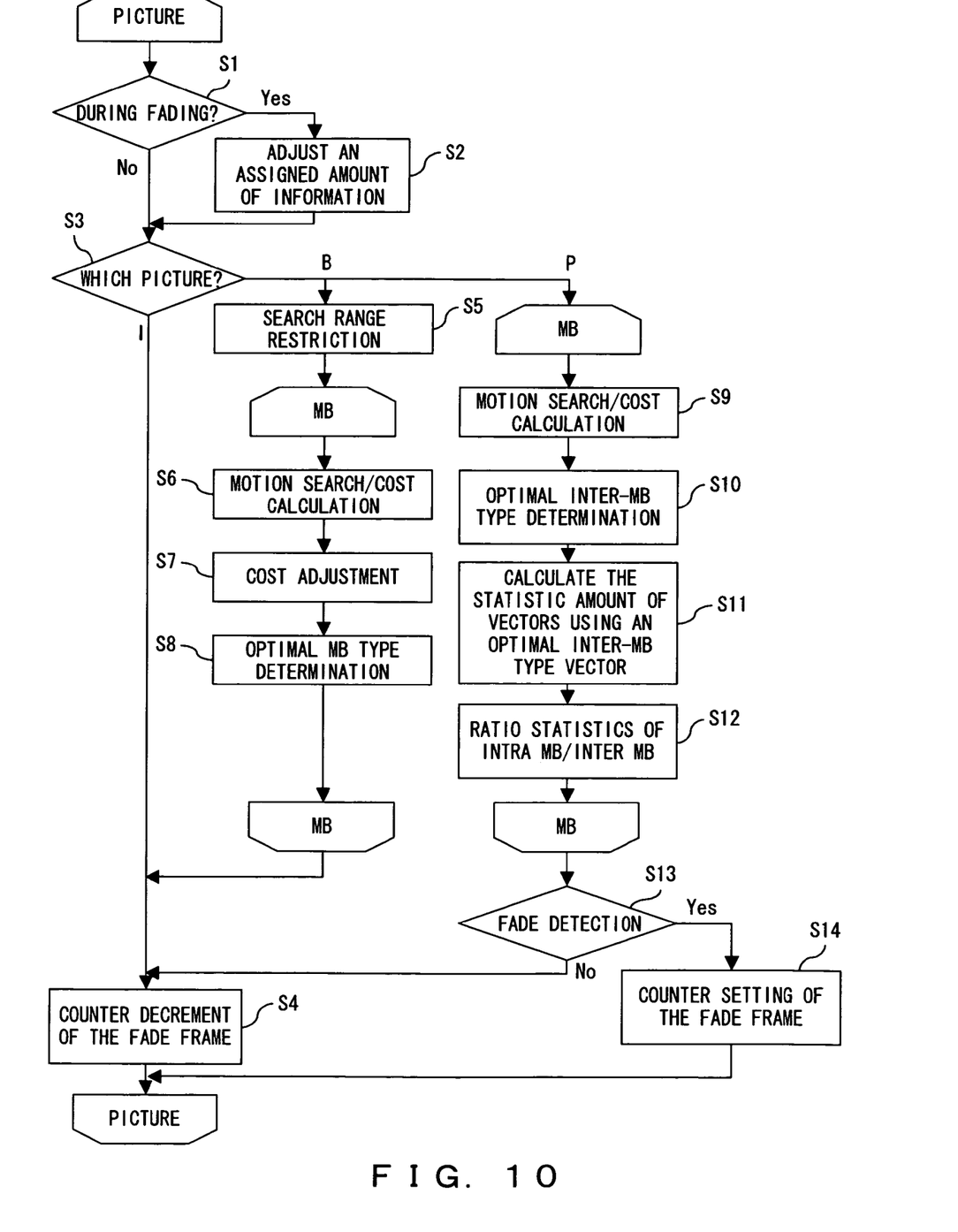
FIG. 10 is a flowchart showing the fade detection process.

FIG. 10 is a flowchart showing the fade detection process. In FIG. 10, the fade detection process executed when the encoding unit 100 encodes one picture is excerpted and its flow is shown. Thus, the processes in steps S1-S14 are performed for each picture. Next, the operation of the fade determination unit 200 is described in detail with reference to FIG. 10. In FIG. 10, a motion compensation block is described as MB (macro-block).

The fade determination unit 200 comprises, for example, a CPU 201, ROM 202 and RAM 203. In such a configuration, the flowchart shown in FIG. 10 is realized by the CPU 201 reading a program for realizing the process shown in the flowchart (fade scene detection program) from the ROM 202 to the RAM 203 and executing it.

When the process of one subsequent picture is started, firstly, in step S1 it is determined whether the picture is being faded. If a target picture is currently within the range of a fade scene detected immediately before, the determination is yes, and in step S2 the adjustment of the assigned amount of information for one picture and a target amount of information in one GOP are instructed to the rate control unit 113.

Then, the process proceeds to step S3. Otherwise, the determination is no, and the process proceeds to step S3.

In step S3, the type of the target picture is determined. If the picture is an I picture, it is determined so and the process proceeds to step S4. In step S4, after the value of a counter for specifying a fade scene range is decremented, a series of processes of the target one picture are terminated. If the picture is a B picture, it is determined so and the process proceeds to step S5.

In step S5, the motion search range of the ME unit 102 is restricted as shown in FIG. 5 and so on, according to whether or not it is being faded. Thus, according to whether or not it is being faded, the ME unit 102 performs motion search/cost (SAD) calculation, cost adjustment and optimal MB type determination for each MB (steps S6-S8). Then, the process proceeds to step S4.

If the target picture is a P picture, in step S3 it is determined so, and steps S9-S12 are executed for each MB. Thus, the ME unit 102 performs motion search/cost (SAD) calculation (step S9) and determines an optimal inter-MB type, based on the calculation result (step S10). Then, the calculation of the above-described conditional expressions (1) and (2) (step S11) and the above-described conditional expressions (3) and (4) (step S12) are made using information inputted from the ME unit 102. After such all operations are applied to all MBs, the process proceeds to step S13.

In step S13, it is determined whether a fade is detected, based on the final results of conditional expressions (1)-(4). If all conditional expressions (1)-(4) are met, the determination is yes and in step S14 a value is set in the counter according to the status then. Then, a series of processes of one picture are terminated. Otherwise, the determination is no, and the process proceeds to step S4.

The value set in the counter according to a status is the number of pictures constituting the range shown in FIG. 6 if it is not being faded and the number of pictures up to a subsequent P (or I) pictures if it is being faded. By setting such a number in the counter, in step S1 it is determined that it is yes if the value is one or more.

Although in this preferred embodiment, a fade is detected when the picture is a P picture, a fade can also be detected when it is a B picture. Alternatively, a fade can be detected when it is either P or B picture.

The fade determination unit 200 can be realized by the CPU 201, ROM 202 storing a program for performing fade detection and work memory (RAM) 203. The encoding unit 100 can also be realized similarly. Therefore, at least one of the programs for enabling the fade determination unit 200 and encoding unit 100 to operate so can also be stored in a portable storage medium, such an optical disk, a magnet-optical disk or the like, and be distributed. Alternatively, part of or the entire program can be transmitted via a transmission medium used for a communication network. In such a case, by loading it onto a computer, the moving picture encoding device or fade scene detection device adopting the present invention can be realized. The moving picture encoding device adopting the present invention can be realized by loading both the programs enabling the fade determination unit 200 and encoding unit 100 to operate so (corresponding to moving picture encoding program) onto a computer. Therefore, the storage medium can be one accessible by an external device which can be connected to the computer via a communication network.

What is claimed is:

1. A moving picture encoding device for dividing an original picture inputted for each frame into motion compensation blocks and encoding each of the motion compensation blocks using motion compensation inter-frame prediction, comprising:
 a moving picture encoding unit to divide the original picture into motion compensation blocks and to encode each motion compensation block, using inter-frame motion compensation frame prediction;
 a fade scene detection unit to specify a scene as the fade scene, when horizontal and vertical components of the motion vector are Vx and Vy, respectively, expression $\Sigma|Vx|$>first threshold, $\Sigma|Vy|$>second threshold   [expression (1)]

is held, and
 at least one of expressions $|\Sigma Vx/\Sigma|Vx||$<third threshold, $|\Sigma Vy/\Sigma|Vy||$< fourth threshold   [expression (2)], total number of intra-motion compensation blocks/ total number of motion compensation blocks > fifth threshold   [expression (3)], and sixth threshold<$\Sigma$sum of absolute differential values of motion compensation blocks<seventh threshold   [expression (4)]

are held; and
 an encoding control unit to control encoding by the moving picture encoding unit of the original picture constituting the fade scene, according to a detection result of the fade scene detection unit.

2. The moving picture encoding device according to claim 1, wherein
 the fade scene detection unit detects the fade scene from a frame from which the moving picture encoding unit obtains a first prediction picture, using only a previous original picture in display order as a reference picture.

3. The moving picture encoding device according to claim 2, wherein
 when detecting the fade scene, the fade scene detection unit specifies range in which the fade scene is continuing between frame which is located immediately before and after the first prediction picture in the display order, and from which other first prediction picture is obtained, or encodes original picture using intra-frame prediction.

4. The moving picture encoding device according to claim 1, wherein
 when the expression (1) is held and at least the expression (2) from among the expressions (2) to (4) are held, the fade scene detection unit specifies the scene as the fade scene.

5. The moving picture encoding device according to claim 1, wherein
 when the fade scene detection unit detects the fade scene, the encoding control unit controls encoding by the moving picture encoding unit by at least one of further narrowing a range for searching for the motion vector, further facilitating selection of bi-directional prediction, further facilitating selection of a zero point by a motion vector and increasing the amount of data assigned to encoded data.

6. A fade scene detection device for detecting a fade scene inserted in a moving picture, comprising:
 an acquisition unit to obtain at least one of a total number of motion compensation blocks and a total number of intra-motion compensation blocks being motion compensation blocks encoded as still pictures in addition to the motion vector detected for each motion compensation block by the moving picture encoding unit which are obtained when dividing an original picture inputted for each frame as the moving picture into motion compensation blocks and encoding each of the motion compensation blocks using inter-motion compensation frame prediction, as information for the fade scene detection; and a fade scene detection unit to specify a scene as the fade scene, when horizontal and vertical components of the motion vector are Vx and Vy, respectively, expression $$\Sigma|Vx|>\text{first threshold}, \Sigma|Vy|>\text{second threshold} \quad \text{[expression (1)]}$$

is held, and
at least one of expressions $$|\Sigma Vx|/\Sigma|Vx|<\text{third threshold}, |\Sigma Vy|/\Sigma|Vy|< \text{fourth threshold} \quad \text{[expression (2)]},$$

$$\text{total number of intra-motion compensation blocks}/ \text{total number of motion compensation blocks}> \text{fifth threshold} \quad \text{[expression (3)], and}$$

$$\text{sixth threshold}<\Sigma\text{sum of absolute differential values of motion compensation blocks}<\text{seventh threshold} \quad \text{[expression (4)]}$$

are held.

7. A non-transitory computer-readable portable storage medium on which is recorded a program for enabling a computer to realize a moving picture encoding device for dividing an original picture inputted for each frame into motion compensation blocks and encoding each of the motion compensation blocks using motion compensation inter-frame prediction, wherein the program makes the computer perform a process comprising:

moving picture encoding to divide the original picture into motion compensation blocks and to encode each of the motion compensation blocks, using the motion compensation inter-frame prediction;

fade scene detecting to specify a scene as the fade scene, when horizontal and vertical components of the motion vector are Vx and Vy, respectively, expression $$\Sigma|Vx|>\text{first threshold}, \Sigma|Vy|>\text{second threshold} \quad \text{[expression (1)]}$$

is held, and
at least one of expressions $$|\Sigma Vx|/\Sigma|Vx|<\text{third threshold}, |\Sigma Vy|/\Sigma|Vy|<\text{fourth threshold} \quad \text{[expression (2)]},$$

$$\text{total number of intra-motion compensation blocks}/ \text{total number of motion compensation blocks}> \text{fifth threshold} \quad \text{[expression (3)], and}$$

$$\text{sixth threshold}<\Sigma\text{sum of absolute differential values of motion compensation blocks}<\text{seventh threshold} \quad \text{[expression (4)]}$$

are held; and encode controlling to control encoding of the original picture constituting the fade scene in the moving picture encoding, according to a detection result in the fade scene detecting.

8. The non-transitory computer-readable storage medium according to claim 7, wherein the fade scene detecting the fade scene from a frame from which a first prediction picture is obtained in the moving picture encoding, using only a previous original picture in display order as a reference picture.

9. The non-transitory computer-readable storage medium according to claim 7, wherein in the fade scene detecting, when detecting the fade scene, space between original picture frames in which other first prediction pictures located immediately before and after the first prediction picture in the display order are obtained or in which encoding is performed using intra-frame prediction is specified as a range in which the fade scene continues.

10. The non-transitory computer-readable storage medium according to claim 7, wherein the fade scene detecting specifies the scene as the fade scene, when the expression 1 is held and at least the expression (2) from among the expressions (2) to (4) are held.

11. The non-transitory computer-readable storage medium according to claim 7, wherein the encode controlling, when the fade scene is detected in the fade scene detecting, performs at least one of further narrowing a range for searching for the motion vector, further facilitating selection of bi-directional prediction, further facilitating selection of a zero point by a motion vector and increasing the amount of data assigned to encoded data so as to control encoding in the moving picture encoding.

12. A non-transitory computer-readable portable storage medium on which is recorded a program for enabling a computer to realize a fade scene detection device for detecting a fade scene inserted in a moving picture, wherein the program makes the computer perform a process comprising:

acquisitioning to obtain at least one of a total number of motion compensation blocks and a total number of intra-motion compensation blocks being motion compensation blocks encoded as still pictures in addition to a motion vector detected in each of the motion compensation blocks which are obtained when dividing the original picture inserted for each frame as the moving picture into motion compensation blocks and encoding it, using the motion compensation inter-frame prediction; and fade scene detecting to specify a scene as the fade scene, when horizontal and vertical components of the motion vector are Vx and Vy, respectively, expression $$\Sigma|Vx|>\text{first threshold}, \Sigma|Vy|>\text{second threshold} \quad \text{[expression (1)]}$$

is held, and
at least one of expressions $$|\Sigma Vx|/\Sigma|Vx|<\text{third threshold}, |\Sigma Vy|/\Sigma|Vy|<\text{fourth threshold} \quad \text{[expression (2)]},$$

$$\text{total number of intra-motion compensation blocks}/ \text{total number of motion compensation blocks} > \text{fifth threshold} \quad \text{[expression (3)], and}$$

$$\text{sixth threshold} <\Sigma\text{sum of absolute differential values of motion compensation blocks} <\text{seventh threshold} \quad \text{[expression (4)]}$$

are held.

* * * * *